United States Patent [19]

Clarke et al.

[11] Patent Number: 5,982,917
[45] Date of Patent: Nov. 9, 1999

[54] COMPUTER-ASSISTED METHOD AND APPARATUS FOR DISPLAYING X-RAY IMAGES

[75] Inventors: Laurence P. Clarke, Temple Terrace; Wei Qian, Wesley Chapel; Lihua Li, Tampa, all of Fla.

[73] Assignee: University of South Florida, Tampa, Fla.

[21] Appl. No.: 09/138,492

[22] Filed: Aug. 24, 1998

Related U.S. Application Data

[62] Division of application No. 08/659,061, Jun. 3, 1996, Pat. No. 5,799,100.

[51] Int. Cl.$^6$ ............................................. G06K 9/00
[52] U.S. Cl. .................................... 382/132; 128/922
[58] Field of Search ............................ 382/128, 132, 382/284; 128/920, 922; 345/115

[56] References Cited

U.S. PATENT DOCUMENTS

| | | | |
|---|---|---|---|
| 5,212,637 | 5/1993 | Saxena | 364/413.26 |
| 5,627,907 | 5/1997 | Gur et al. | 382/132 |
| 5,633,948 | 5/1997 | Kegelmeyer, Jr. | 382/132 |
| 5,761,334 | 6/1998 | Nakajima et al. | 382/132 |

OTHER PUBLICATIONS

Qian et al., "Computer Assisted Diagnosis for Digital Mammography," IEEE Engineering in Medicine and Biology, vol. 14, No. 5, Sep./Oct. 1995, pp. 561–569.

*Primary Examiner*—Andrew W. Johns
*Attorney, Agent, or Firm*—Allen, Dyer, Doppelt, Milbrath & Gilchrist, P.A.

[57] ABSTRACT

A computer-assisted diagnostic (CAD) method and apparatus are described for the enhancement and detection of suspicious regions in digital X-ray images, with particular emphasis on early cancer detection using digital mammography. An objective is to improve the sensitivity of detection of suspicious areas such as masses, while maintaining a low false positive detection rate, and to classify masses as benign or malignant. A modular CAD technique has been developed as a potentially automatic and/or second-opinion method for mass detection and classification in digital mammography that may in turn be readily modified for application with different digital X-ray detectors with varying gray-scale and resolution characteristics. The method consists of using a plurality of CAD modules to preprocess and enhance image features in the gray-level, the directional texture, and the morphological domains.

5 Claims, 9 Drawing Sheets

COMPUTER-ASSISTED METHOD AND APPARATUS FOR DISPLAYING X-RAY IMAGES

CROSS REFERENCE TO RELATED APPLICATION

This application is a divisional of application Ser. No. 08/659,061 filed Jun. 3, 1996 and issuing as U.S. Pat. No. 5,799,100, commonly owned and assigned with the present application.

BACKGROUND OF THE INVENTION

1. Field of the Invention

The invention relates to the development of computer-assisted diagnostic (CAD) methods for the analysis of digital X-ray images or gray-scale images generated by other digital sensors. More particularly, the invention relates to the use of CAD methods for the analysis of mammography images.

2. Description of Related Art

The use of computer-assisted diagnostic (CAD) methods has been proposed as a second opinion strategy for various medical imaging applications that include breast screening using digital mammography. The goals of the CAD methods are to improve mammographic sensitivity by increasing the detection of potentially significant suspicious areas, to improve specificity by reducing false-positive interpretations, and to classify suspicious areas as benign or malignant, ultimately reducing the number of unnecessary biopsies of benign lesions (Giger, 1993; Vyborny et al., 1994; Adler et al., 1995). Two major roles of CAD in mammography are detection and classification. These have been primarily directed towards the study of microcalcifications and masses, where the masses are comparatively more difficult to detect than microcalcifications because masses can be simulated or obscured by normal breast parenchyma.

Mass Detection Methods. Numerous investigators have addressed mass detection and classification. The methods reported in the literature for mass detection can be grouped into two categories. In the first category, the methods involve the use of asymmetry measures of the left and right breast. The detection of masses is based on deviations from the architectural symmetry of normal right and left breasts, with asymmetry indicating suspicious areas. The basic approach of the methods in this category is to search for brightness or texture differences between corresponding locations on left and right images (Winsberg et al., 1967; Hand et al., 1979; Semmlow et al., 1980; Kimme et al., 1975; Hoyuer et al., 1978/79; Lau et al., 1991).

Giger and her colleagues (Giger et al., 1990; Yin et al., 1991) expanded on this approach of using left-to-right breast asymmetries for the detection of subtle masses. Multiple subtraction images are formed to enhance asymmetries. Feature extraction is used to decrease the number of false-positive detections.

Miller and Astley (193) proposed an automatic method for detecting asymmetry based on the comparison of corresponding anatomic structures identified by the shape and brightness distribution of these regions. The detection performance of these methods depends strongly on two factors, the alignment of left and right breast images and the individual feature analysis of breast images. Due to the fact that the size and shape of the two breasts may be different, it may be difficult to identify accurately corresponding locations. The asymmetry cues generated may not be sufficiently specific to be used as prompts for small and subtle abnormalities in CAD systems. Individual image feature analysis is the basis of alignment and the comparison of symmetry, and is closely related to the second class of mass detection methods.

The second class of CAD methods focus on the determination of features that allow the differentiation of masses from normal parenchymal tissues in a given image. They consist of two major steps: feature extraction and discrimination. The features include textures derived from a gray-level dependence matrix (Miller and Astley, 1993; Chan et al., 1995), texture energy obtained from the output of Law's filters (Gupta et al., 1995), density and morphological features (Lai et al., 1989; Brzakovic et al., 1990). Recently, Chan et al. (Petrick et al., 1995) investigated the advantage of combining the morphological and texture features for mass detection. Single-scale preprocessing methods have also been reported for improved feature extraction such as histogram equalization, morphological operators (Gupta et al., 1995), and selective median filtering (Lai et al., 1989). Cerneaz and Brady (Cerneaz et al., 1994) presented a technique for extracting a description of the curvilinear structures in a form that allows many difficulties resulting from the complication of intense textural components of images in the analysis of a mammogram to be overcome. Alternatively, because the size, shape, and the gray-level profile of the masses vary from case to case in mammograms, multiresolution analysis methods have been used in mass detection for improved image segmentation, feature enhancement, and extraction based on fuzzy pyramid linking (Brzakovic et al., 1990) and Gaussian filters (Barman et al., 1993, 1994).

Wavelet-based methods have been proposed for image enhancement in digital mammography. For example, Laine et al. (1994) used wavelet maxima coefficients for image enhancement and multiscale edge representation, the work being a modification of the dyadic wavelet transform originally proposed by Mallat (1992). Various approaches were used for image enhancement, including the use of linear, exponential, and constant weight functions for modification of the coefficients of the original dyadic wavelet transform. In this work the use of preprocessing for noise removal was not used, and so multiscale edges are mixed with structured noise in digital mammograms. Similarly, a modification of the coefficients of the dyadic wavelet transform may result in less than optimal reconstruction. Similarly, the wavelet transforms are not implemented on filter banks such as quadrature mirror filters. Emphasis is placed on the use of the dyadic wavelet transform for image enhancement for improved visual diagnosis.

Malignant breast lesions are frequently characterized by a stellate or spiculated appearance n x-ray mammograms. The automated detection of such lesions is a challenging task because of the high degree of similarity between such lesions and other normal structures within the breast. CAD methods have also been reported with a specific emphasis on speculated lesions. The methods include: (a) analysis of the orientation of edges through the image to identify areas of locally radiating structure, with false positive reduction using Law's texture analysis (Kegelmeyer, 1992; Kegelmeyer et al., 1994; (b) use of radial line enhancement followed by Bayesian combination of caes generated by the Hough transform (Astley, et al., 1993); (c) use of gray-scale seed-growing methods to allow analysis of radial gradient histograms surrounding the mass of interest (Giaer et al., 1994a), and finally (d) detection of stellate patterns without assuming the presence of a central mass for the detection of subtle cancers with line orientation obtained by three second order Gaussiar derivative operators (Karssemeijer, 1994).

Based on the principle of image formation and the human visual system (HVS) perception analysis of blur and edge localization, Claridge and Richter (Clariage et al., 1994) investigated methods of improving the diagnosis of mammographic lesions by using computer image analysis methods for characterization of lesion edge definition and accurate localization of the lesion boundary.

Classification methods proposed to differentiate masses from normal tissue have included the use of decision trees (Li et al., 1995; Kegelmeyer et al., 1994), Bayes classifiers (Brzakovic et al., 1990), linear discriminant analysis (Chan et al., 1995), linear and quadratic classifiers (Woods et al., 1994), and neural networks (NN) (Petrick et al., 1995; Wu et al., 1993).

The methods known in the art generally use sensitivity of detection and false positive detection rate as means for evaluating CAD algorithms (Lai et al., 1989; Brzakovic et al., 1990) and have met with varying levels of success for the databases containing only circumscribed, speculated, or all types of masses. Since the image databases vary, a direct comparison cannot be made.

Mass Classification (Benign versus Malignant). Features proposed for mass classification specifically using visual criteria have been reported (Wu et al., 1993) that closely correlate with the American College of Radiology (ACR) Lexicon visual criteria. They include density-related features, shape and size features, mass margins, spiculations, and correlation with other clinical data, including the patient's age. The computation of image-related features has been proposed (Kilday et al., 1993) with an emphasis on gross and fine shape-related features that include three radial length measures, tumor boundary roughness, and area parameters. The use of mass-intensity-related features using fractional dimension analysis and nonlinear filters has been proposed for quantifying the degree of lesion perfusion to identify malignant lesions with rough intensity surfaces (Burdett et al., 1993).

Since most breast carcinomas have the mammographic appearance of a stellate lesion, spiculation analysis has been greatly emphasized. Known methods include: (a) use of a line-enhancement operator to measure linearity, length, and width parameters (Parr et al., 1994), (b) second-order Gaussian derivatives to measure line orientation to determine the total number of pixels pointing in the direction of the center of the mass, with a binomial statistical analysis of the angular distributions of the spiculations (Karssemeijer, 1994). Claridge et al. (1994) used a similar spiculation index to reflect the relative magnitude of horizontal/vertical directions. (c) Huo et al. (1995) have reported a comprehensive approach using both radial edge gradient analysis and cumulative edge gradient distribution, determined by seed growing, within manually defined regions of interest.

Several investigators have indicated the need to include features in all three domains (gray scale, morphological, and texture) to improve classification performance (Huo et al., 1995; Parr et al., 1994). Similarly, feature extraction of speculations may be influenced by local variations in parenchymal tissue background (Huo et al., 1995; Parr et al., 1994). However, spiculation analysis may provide a means of differentiation of spiculations from other directional features within the mammogram (Karssemeijer, 1994). The classificaticon methods employed are similar to those used for mass detection, with an emphasis on the use of back-propagation NNs (Huo et al., 1995; Wu et al., 1993), where variations in She output node of the NN can be employed to generate computer or simulated receiver operating characteristic (ROC) curves as a means for evaluation of the CAD method or modification to CAD modules (Huo et al., 1995; Lo et al., 1995). The accuracy of a detection or classification algorithm can be characterized entirely by an ROC curve (Metz, 1986, 1989) or a free-response ROC (FROC) curve (Chakraborty, 1989).

SUMMARY OF THE INVENTION

It is therefore an object of the present invention to provide a method and apparatus for improved sensitivity and specificity in mass detection in mammography.

It is another object to provide such a method and apparatus for improved classification accuracy of masses.

It is a further object to provide such a method and apparatus that permits improved feature extraction in a plurality of domains.

It is an additional object to provide such a method and apparatus for use as a second opinion strategy.

It is yet another object to provide such a method and apparatus for use in remote diagnoses.

These and other objects are achieved by the present invention, a modular CAD method and apparatus that comprises image preprocessing to allow improved feature extraction in the gray-level, directional texture, and morphological (shape) domains. This method and apparatus achieve improved sensitivity and specificity in mass detection in mammography images.

The invention can be used, for example, as a "second opinion" strategy or "prereader strategy" at either a centralized location or remote locations using teleradiology/telemedicine strategies, although these uses are not intended to be limiting.

The objectives are: (a) to use image enhancement and segmentation methods to improve visual interpretation on a computer monitor and thus at least partly to compensate for monitor performance versus conventional light box/film image interpretation; and (b) to use CAD methods for detection and classification to locate suspicious regions and provide a mathematical probability of whether they are benign or malignant.

Although not meant to be limiting, the method and apparatus of the present invention are applicable to images such as masses present in a digital mammogram. It is believed that the combined approach of visual and computer aids should thus reduce the inter- and intraobserver variation in image interpretation at, for example, centralized or remote locations and/or when using networked medical computer workstations.

The invention, in terms of computer software design, relates to the use of image preprocessing CAD modules that allow features to be extracted more effectively in the gray-level, directional texture, and morphological domains, to improve detection and classification of suspicious areas such as masses in digital mammography. The methods for feature extraction allow feature selection and pattern recognition methods to be more effectively implemented.

Broadly, the invention includes a plurality of modules:
1. A filter, which may comprise a multistage nonlinear tree structured filter (TSF) or an adaptive multistage nonlinear filter (AMNF), for image noise suppression and improved feature extraction in the gray-level domain;
2. An N-directional wavelet transform (DWT) for decomposing the filtered image to obtain high (N) orientation selectivity in the directional texture domain;

3. An image smoothing algorithm to remove directional features from the decomposed image, and a transform, such as an M-channel tree structured wavelet transform (TSWT), for enhancing suspicious areas cascaded with an algorithm, such as an adaptive clustering algorithm for segmenting suspicious areas for all mass types to allow features to be computed in the morpholoichal (shape) domain;

4. A directional feature analysis and enhancement module, for differentiating directional features within the digital mammogram from potential spiculations associated with spiculated masses and for computing features in the directional texture domain;

5. A mass detection module, for classifying suspicious areas as masses or normal tissue, such as by pattern recognition methods; and 6. A mass classification module, for classifying masses as benign or malignant, such as by pattern recognition methods.

Typically the apparatus includes a medical image workstation using high-resolution monitors to display raw, enhanced, and segmented images to permit better visual interpretation.

Among the unique aspects of this method and apparatus are the use of multiresolution/multiorientation wavelet transforms in the image preprocessing for improved feature extraction in the three recited domains (gray-level, morphological, and directional texture) and the use of higher-order transforms (M,N) and adaptive image processing methods to potentially accommodate the gray-scale and response characteristics of different sensors.

The features that characterize the invention, both as to organization and method of operation, together with further object and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more gully apparent as the description that now follows is read in conjunction with the accompanying drawing.

DETAILED DESCRIPTION OF THE PREFERRED EMBODIMENTS

Figure 1:
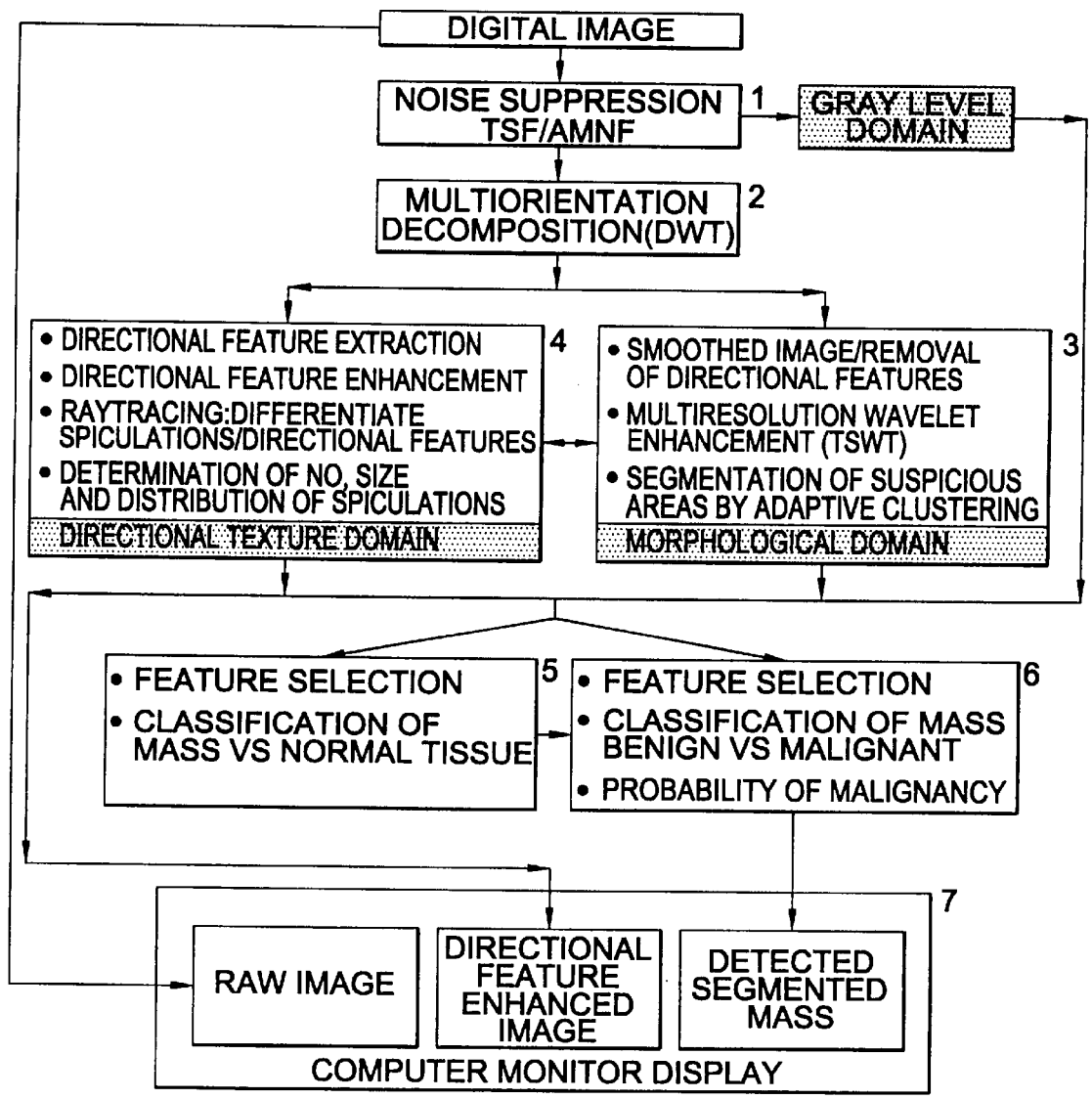
FIG. 1 is a block diagram of the CAD modules leading from a digital image to a display of the enhanced and raw images.

A description of the preferred embodiments of the present invention will now be presented with reference to FIGS. 1–10. The abbreviations used to describe the CAD modules are listed in Table 1 for convenience.

The apparatus comprises, and the method comprises the use of, a plurality of CAD modules applied to a raw digital x-ray image for the determination of a suspicious mass and the classification thereof. In a preferred embodiment, the enhanced images comprise a plurality of enhanced images having experienced a plurality of processing steps. The enhanced images are then displayed with the raw image, a visual comparison permitting an improved interpretation of a detected mass.

TABLE 1

GLOSSARY OF TERMS AND ABBREVIATIONS

| | |
|---|---|
| Segmentation: | |
| TSF | Tree-structured filter for image noise suppression |
| AMNF | Adaptive multistage nonlinear filter for image noise suppression |
| TSWT | Tree-structured wavelet transform for multiresolution image segmentation |
| DWT | Directional wavelet transform for multiorientation feature extraction |
| AC | Adaptive clustering for segmentation |
| Enhancement: | |
| TSWT | Tree-structured wavelet transform for image enhancement |
| DWT | Directional filtering based on wavelet transform for multidirectional image enhancement |

TABLE 1-continued

GLOSSARY OF TERMS AND ABBREVIATIONS

Detection:

| | |
|---|---|
| FBDT | Fuzzy binary decision tree for recognition of suspicious areas |
| MFNN | Mixed-feature neural network for detection of suspicious areas |
| KF | Kalman filtering for efficient training of NNs using backpropagation |
| PNN | Probability neural network for mass classification |

Filter Parameters:

| | |
|---|---|
| M | Number of channels for TSWT |
| N | Number of directions for DFWT |
| LO | Linear operator for AMNF |
| OS | Order statistic operator for AMNF |
| NMNV | Adaptive optimization: nonstationary mean and nonstationary variance |
| LLMMSE | Adaptive optimization: local linear minimization mean-square error |

Clinical Evaluation:

| | |
|---|---|
| CAD | computer-assisted diagnosis |
| ROC | Receiver response operator characteristics |
| TF | True positive detection rate |
| FP | False positive detection rate |

Image Noise Suppression

1. CAD Module 1

The digital x-ray image is preferably first filtered by either a multistage tree structured nonlinear filter (TSF) with fixed parameters or an adaptive multistage nonlinear filter (AMNF) to suppress image noise while preserving image details potentially to improve feature extraction in the gray-level domain. Digital mammographic images generated by either X-ray film digitizers or by direct digital X-ray sensors currently under development generate various sources of noise in the detection process, as described previously (Qian et al., 1994a,b).

The presence of noise or structured noise may degrade the ability to extract features in the gray-level domain or texture features with high directional sensitivity using the DWT CAD module 2. Two noise-suppression filters are proposed, although these are not meant to be limiting: (a) a tree-structured nonlinear filter (TSF) with fixed parameters for a given digital sensor that is computationally efficient; and (b) an adaptive multistage nonlinear filter (AMNF), which is more suitable for universal application to different sensors with varying noise characteristics. Both filters are applied on a pixel-by-pixel basis throughout the full mammographic image. Both filters can be incorporated into the modular CAD structure shown in FIG. 1.

Tree-structured filter (TSF). The TSF is a three-stage filter designed with central weighted median filters (CWMFs) as subfiltering blocks (see FIG. 1 in Qian et al., 1994a). Modified windows of the filter bank in the first stage and comparison of the filtered image to the raw image for each stage are used to preserve image detail, such as parenchymal tissue structures, with significantly improved noise reduction compared with conventional single-stage filters such as the median filter.

Details of the theoretical basis for this TSF and analysis of its performance have been published using both simulated images with varying noise content and representative mammographic images (Qian et al., 1994a, the discussion of which is hereby incorporated herein by reference).

Adaptive multistage nonlinear filter (AMNF). The AMNF is a two-stage filter that incorporates an adaptive operation. The first stage contains, by way of example, five different conventional filters with varying filter window sizes, namely, a linear filter (9×9 window), $\alpha$ trimmed mean (7×7 window), $\alpha$ trimmed mean (5×5 window), $\alpha$ trimmed mean (3×3 window), and median filter (3×2 window) [Qian et al., 1995b, FIG. 2, Eq. (6–15)]. The second stage uses a signal-dependent weighting factor, based on the local signal activity, and its variance are used to select the appropriate filter in the first stage. For example, in the uniform-background regions of the image with slowly changing signal intensity, a smoothing filter with a large window is chosen to suppress noise. Alternatively, in regions of varying signal intensity, such as parenchymal tissue structures or suspicious areas (masses), a filter with a wider window may be chosen better to preserve image details turing noise suppression.

The first stage of the filter may also include other filters, such as the previously described TSF further to preserve image details of suspicious areas and adaptively selected, as previously described. This AMNF filter design has been described in Qian et al. (1995a,b), the contents of which are incorporated herein by reference.

The filtered image comprises an image in the gray-level domain. This filtered image is fed into CAD module 2 for decomposition.

2. CAD Module 2. Directional Wavelet Transform (DWT)

Mallat (1989a) discussed the relationship between multi-channel frequency decomposition and the application of wavelet models. This work includes the conceptual basis for a multiorientation wavelet transform (MWT) but did not provide the wavelet function.

Grossman and Morlet (1984) have proposed a wavelet function that can be modified to generate the multiorientation wavelet transform conceptually suggested by Mallat (1989a), with an appropriate choice of parameters. However, this MWT is only an approximate solution for the proposed application because of limited directional sensitivity. To demonstrate this point, we describe the basis and results for the MWT based on Mallat (1989a) and Grossman and Morlet (1984), the wavelet function used being commonly referred to as the Morlet wavelet function. To obtain the desired directionality off the wavelet transform, we have implemented a modification to the Morlet wavelet function, referred to as the directional wavelet transform (DWT). The DWT has varying orders of directions (N=8, 16, . . . ), where a higher order of N may be used to match the resolution required for feature extraction.

The DWT has been designed to allow the directional features to be extracted for improved segmentation of suspicious areas. This includes the removal of speculations in the case of spiculated masses for segementation purposes and the use of ray-tracing methods to differentiate spiculations from other directional features such as ducts. The speculations can then be added to the detected mass. The DWT can also be used for image enhancement by simply summing the DWT-enhanced image and the raw image.

The modification to the Morlet DWT to extract directional features is first theoretically developed to clarify the novelty in the modified DWT of the present invention. The theoretical basis for the DWT and the spiculation analysis methods are then presented.

General Wavelet Transform and Directional Wavelet Transform.

Let $\psi(x,y) \in L^2(R^2)$ be a function whose Fourier transform $\Psi(w_x, w_y)$ satisfies $$\int_{-\infty}^{+\infty} \frac{|\psi(sw_x, sw_y)|}{s} ds = C_\psi < +\infty, \forall (w_x, w_y) \in \mathbb{R}^2 \quad (1)$$

The wavelet transform of a function f(x,y) ∈ L²(R²) at scale s and a point (u,v) is defined by $$Wf(s, (u, v)) = \int_{-\infty}^{+\infty}\int_{-\infty}^{+\infty} f(x, y)s\psi(s(x-u), s(y-u))dx\, dy \quad (2)$$

Let $$\psi_s(x, y) = s\psi(sx, sy) \quad (3)$$

$$\tilde{\psi}_s(x, y) = \psi_s(-x, -y) \quad (4)$$

Then the wavelet transform of f(x,y) can be rewritten as a convolution product $$Wf(s, (u, v)) = f * \tilde{\Psi}_s(u, v) \quad (5)$$

If the wavelet function $\psi^i(x,y)$ has orientation (direction) selectivity, then the wavelet transform within orientation i is called a directional wavelet transform, and is defined by $$Wf^i((u,v),s) = \int\int f(x,y)s\psi^-(s(x-u),s(y-u))\,dx\,dy \quad (6)$$

Its Fourier transform is $$WF^i(s,\omega_x,\omega_y) = F(\omega_x,\omega_y)\Psi^i(\omega_x/s,\omega_y/s) \quad (7)$$

where $F(\omega_x,\omega_y)$ and $\Psi^i(\omega_x,\omega_y)$ are the Fourier transforms of f(s,y) and $\psi^i(x,y)$, respectively.

Assume the angle of the highest sensitivity of the wavelet function is $\theta_i$; then the MWT within orientation i can be formulated in the Fourier domain with polar coordinate as follows:

$$WF^i(s,\rho,\theta,\theta_i) = F(\rho,\theta)\Psi(\rho/s,\theta,\theta_i) \quad (8)$$

where $$\rho = (\omega_x^2 + \omega_y^2)^{1/2} \quad (9)$$

$$\theta = \arctan \cdot (\omega_y/\omega_x) \quad (10)$$

From the standpoint of filtering, the operation above can be considered to be a multiresolution directional filtering.

Figure 2:
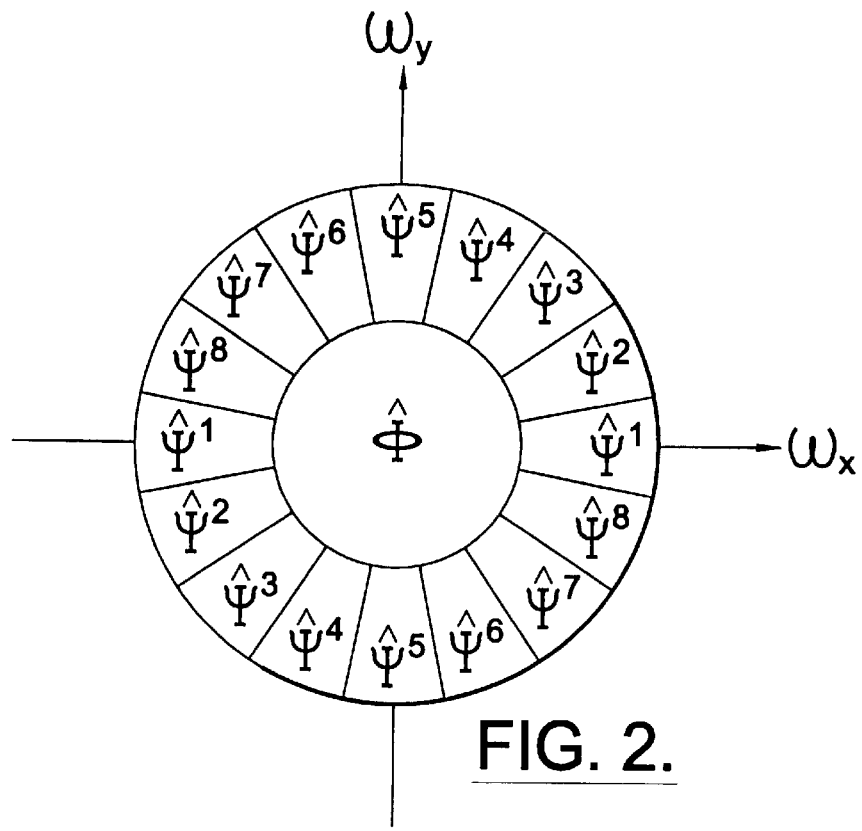
FIG. 2 is a diagram of multiorientation wavelet transform (MWT) decomposition in the Fourier domain of support of $\Psi(\omega_x,\omega_y)$ into 8 wavelets $\Psi^i(\omega_x,\omega_y)$, $1 \leq i \leq 8$, having different orientation selectivities, wherein the supports of the functions $\Psi^i(\omega_x,\omega_y)$ are symmetrical about 0 and are rotated from one another.

Referring to FIG. 2, the decomposition in the Fourier domain of support into 8 wavelets $\Psi^i(\omega_x,\omega_y)$, $1 \leq i \leq 8$, having different orientation selectivities is shown.

Figure 3:
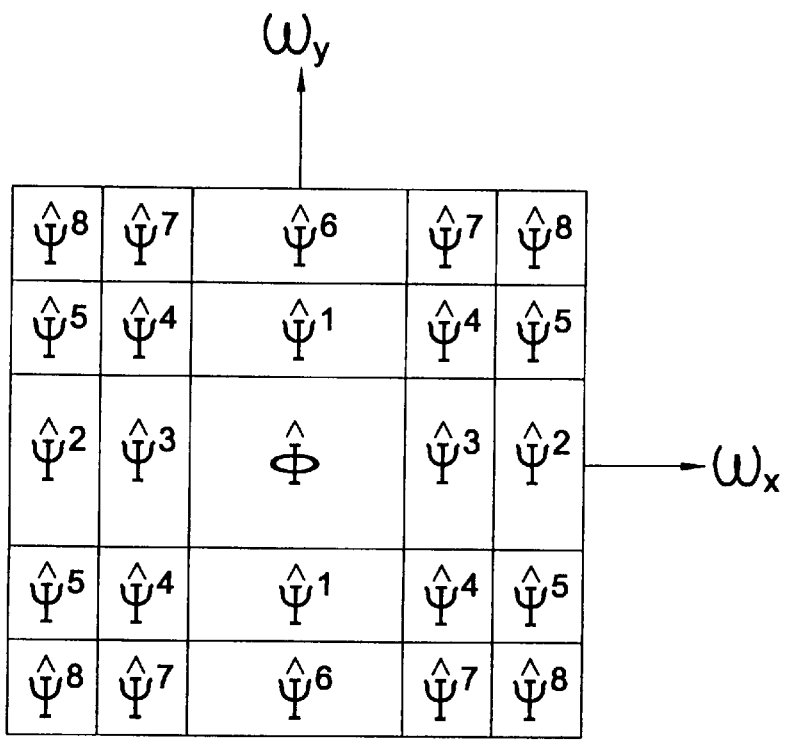
FIG. 3 is a diagram of a multiresolution wavelet decomposition to illustrate that the conventional wavelet transform does not have a directional constraint.

Referring to FIG. 3, a comparison is made to the multi-resolution wavelet transform that does not have directional constraints such as the MWT or DWT.

Theoretical Basis for MWT Using the Morlet Wavelet Function.

If α and/or β is sufficiently large, the following Gabor function can be an approximation of the well-known Morlet wavelet function (Unser et al., 1990).

$$\Psi^i(x, y) = g(x', y')\exp[j(\alpha x' + \beta y')] \quad (11)$$

$$g(x', y') = \frac{1}{\lambda(2\pi)^{1/2}\sigma^2}\exp\left(-\frac{(x/\lambda)^2 + (y')^2}{2\sigma^2}\right) \quad (12)$$

where $$x' = x \cos\theta_1 + y \sin\theta_1 \quad (13)$$

$$y' = x \sin\theta_1 + y \sin\theta_1 \quad (14)$$

Its Fourier transform is $$\Psi(\omega_x, \omega_y) = \exp\left(-\frac{\lambda^2(\omega_x' - \alpha)^2 + (\omega_y' + \beta)^2}{\sigma^2}\right) \quad (15)$$

where $\omega_x', \omega_y'$ are the rotations of $\omega_x$ and $\omega_y$.

Figure 4:
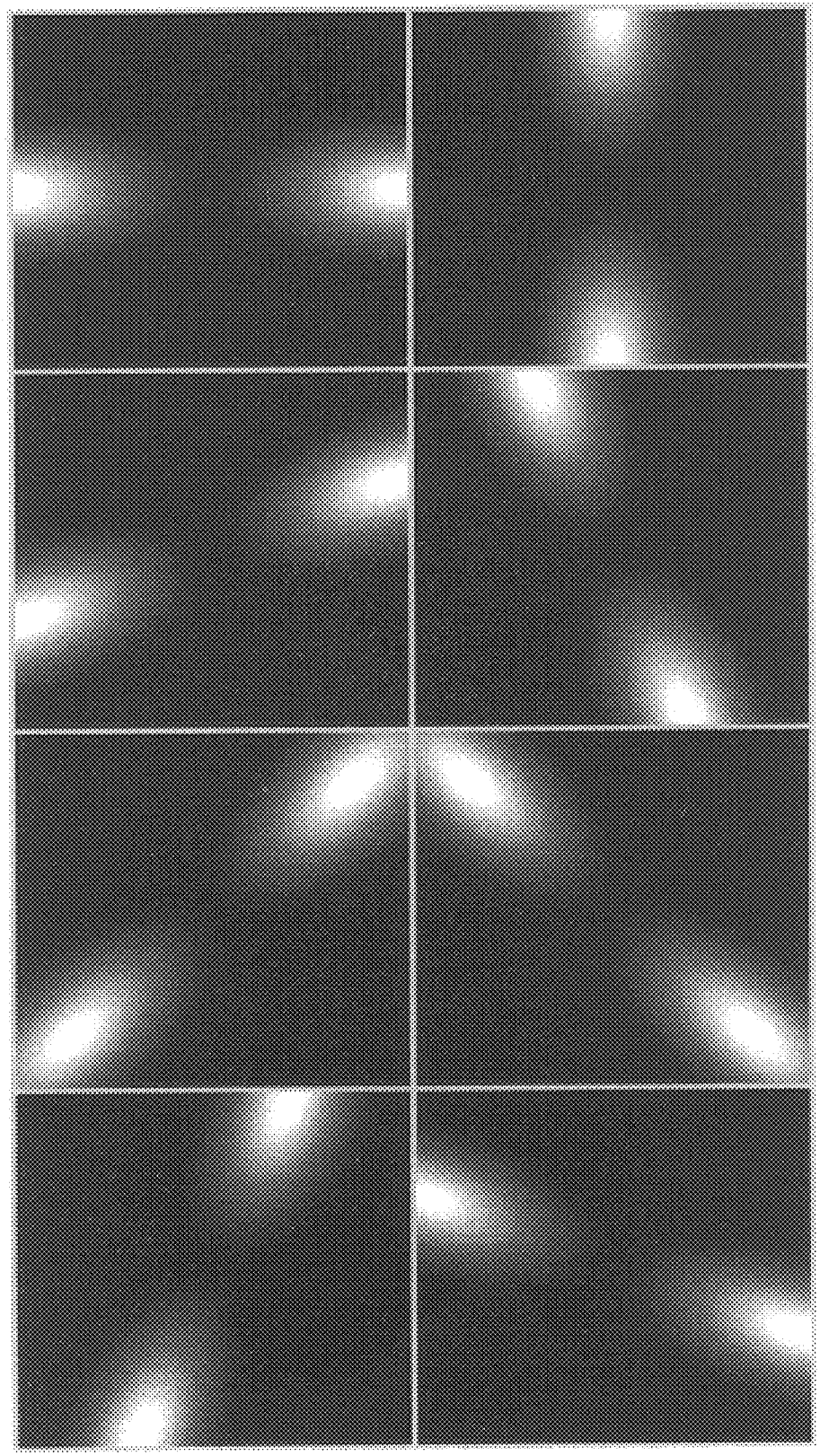
FIG. 4 is a diagram of an MWT decomposition in the Fourier domain of support $\Psi(\omega_x,\omega_y)$ into N=8 wavelets $\Psi^i(\omega_x,\omega_y)$ $1 \leq i \leq 8$, by using the Morlet wavelet function with different parameters, showing limitation in directionality.

With no loss of generality, set β=0. If α is large enough and the parameters (σ and λ) are selected properly, then we can obtain different directional images at different resolution by applying the above directional wavelet function with different $\theta_i$. Referring to FIG. 4, images of eight directional Morlet wavelet functions in the Fourier domain tuned to orientations iπ/8, $0 \leq i \leq 7$, respectively, are shown, where the higher signal intensity reflects the bandwidth range and the directionality of the transform.

Directional wavelet transform (DWT). The limitations of the directionality for the MWT is indicated in FIG. 4, where the bandwidths for each direction are not well defined. To improve the directional selectivity, a modification to the Morlet wavelet function is used to obtain the directional wavelet function, which is described mathematically as follows:

$$\Psi(\omega_x, \omega_y) = \left[1 - \exp\left(-\frac{\omega_x'^2 + \omega_y'^2}{\sigma_1^2}\right)\right]\exp-\left(\frac{\omega_y'^2}{\omega_x'^2}\frac{\ln\sigma_2}{\tanh^2\alpha}\right) \quad (16)$$

where $\omega_x', \omega_y'$ are the rotation coordinates of $\omega_x$ and $\omega_y$, $$\omega_x' = \omega_x \cos\theta + \omega_y \sin\theta \quad (17)$$

$$\omega_y' = \omega_x \sin\theta + \omega_y \cos\theta \quad (18)$$

θ is the direction of the wavelet function; the parameters α and $\sigma_2$ are related to the bandwidth of the orientation; $\sigma_1$ is the lower cutoff frequency of the directional wavelet function. For the general case of an N-directional wavelet transform, the angle θ=iπ/N, where N may be equal to 4, 8, 16, . . . , or example.

It is believed that the use of the N-directional wavelet transform for directional image enhancement: can be matched to the resolution of the digitized image with the use of higher-order (N=8, 16, . . . ) wavelet transforms. Similarly, the use of the N-directional wavelet transform for feature extraction can be matched to the resolution of the image or to extract higher-resolution features by using higher-order (N=8, 16, . . . ) wavelet transforms.

Figure 5:
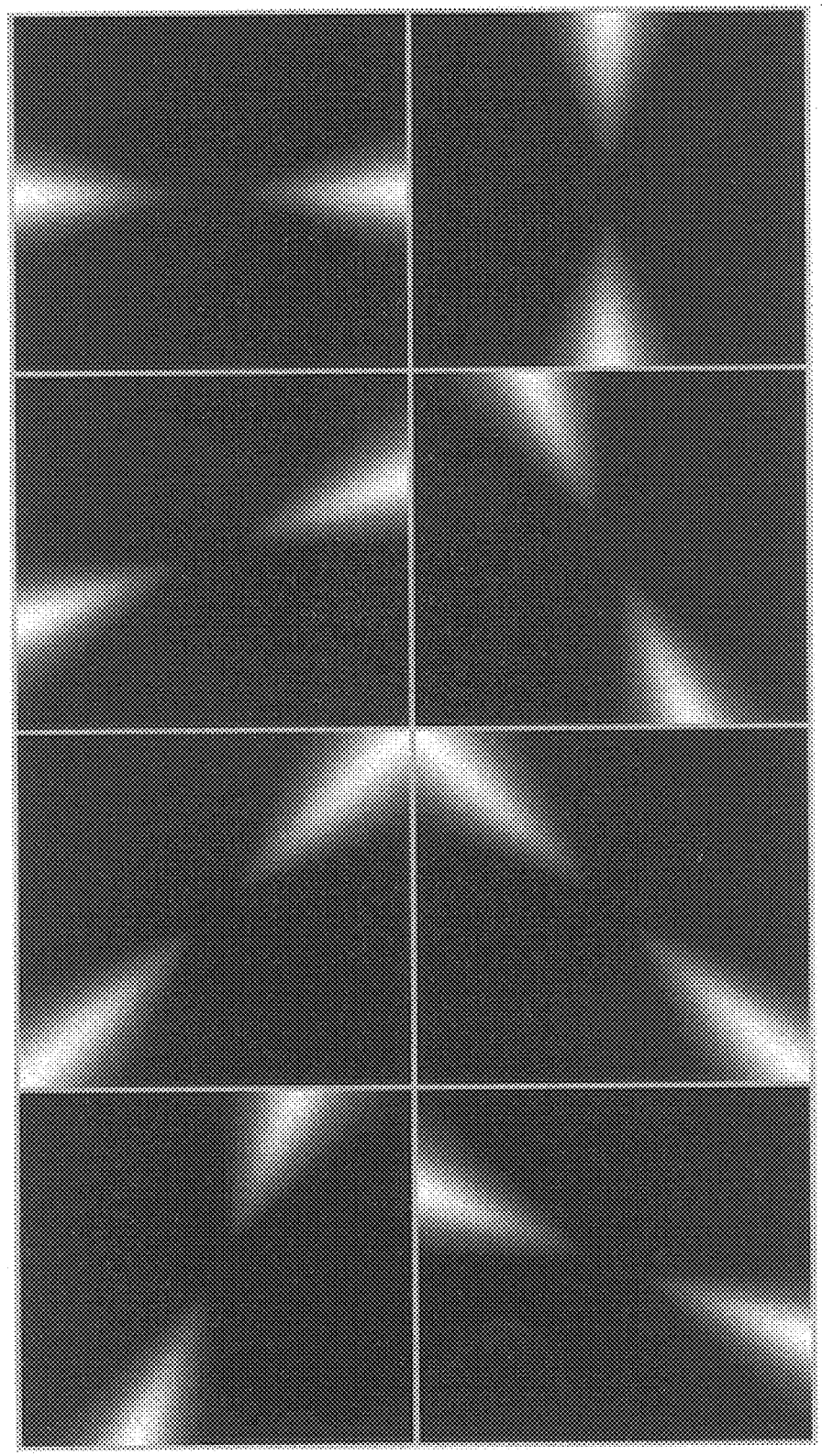
FIG. 5 is a photograph of images of the N=8 directional wavelet transform (DWT) in the Fourier domain with orientations $(i-1)\pi/8$, $1 \leq i \leq 8$, showing the improvement in directionality of the wavelet transform.

Referring to FIG. 5, a set of spectral images of eight wavelet functions with different directions (iπ/8), $0 \leq i \leq 7$ (i.e., N=8), are shown for the proposed DWT, where the narrower bandwidth and improved directionality can be seen compared with the Morlet DWT.

Figure 7:
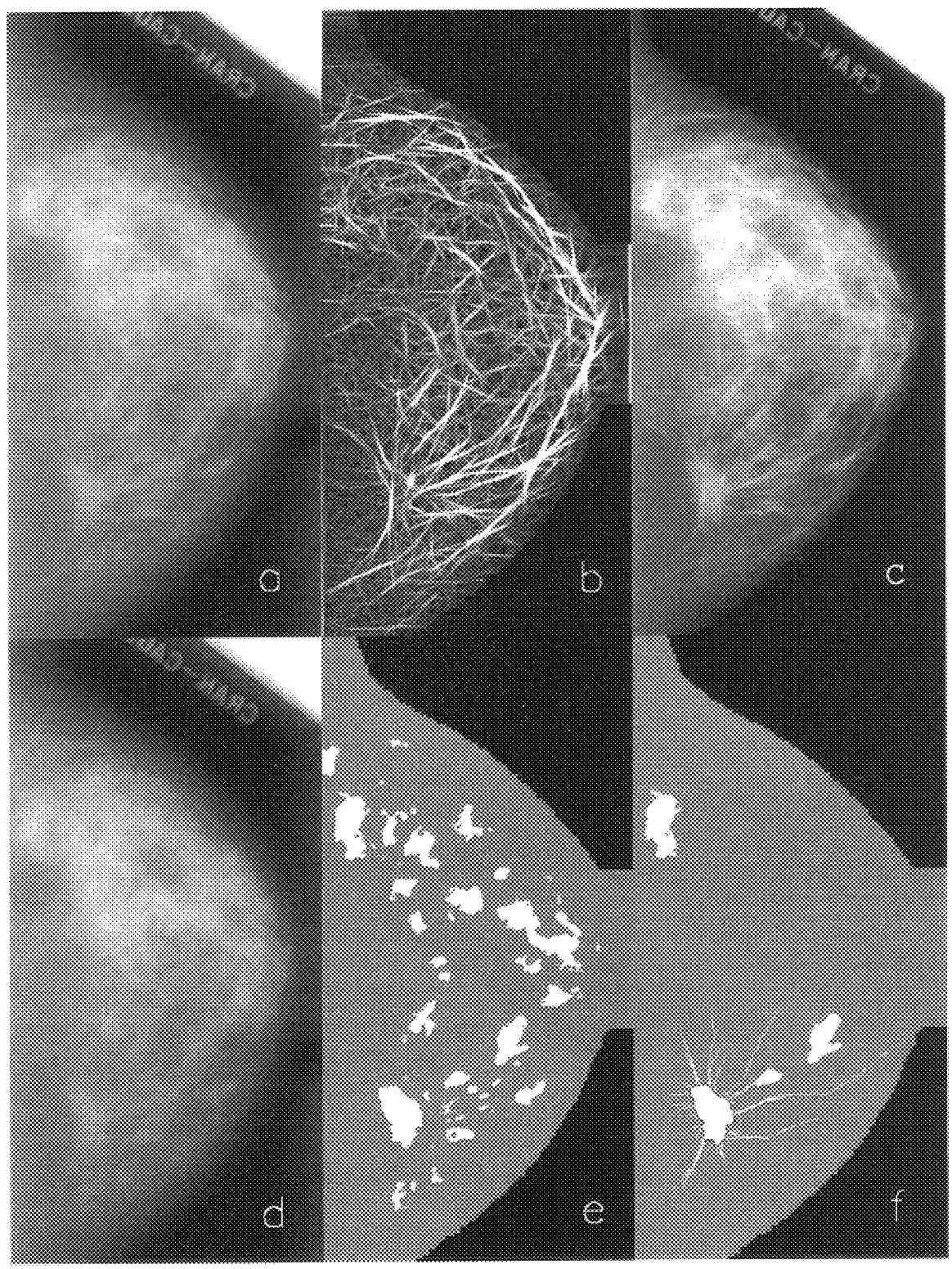
FIG. 7 illustrates the output of some of the modules of the present invention for segmentation of suspicious areas and spiculation extraction: (a) representative raw digitized mammogram for a spiculated mass; (b) directional features computed by the DWT (CAD module 2); (c) enhanced mammogram obtained by adding directional features to the noise-suppressed image (CPD module 4); (d) smoothed image by subtraction of directional features from the noise-suppressed image; (e) segmented image showing the suspicious areas using CAD module 3; if) final detected mass with spiculations and false positives using CAD modules 1–5.
Figure 8:
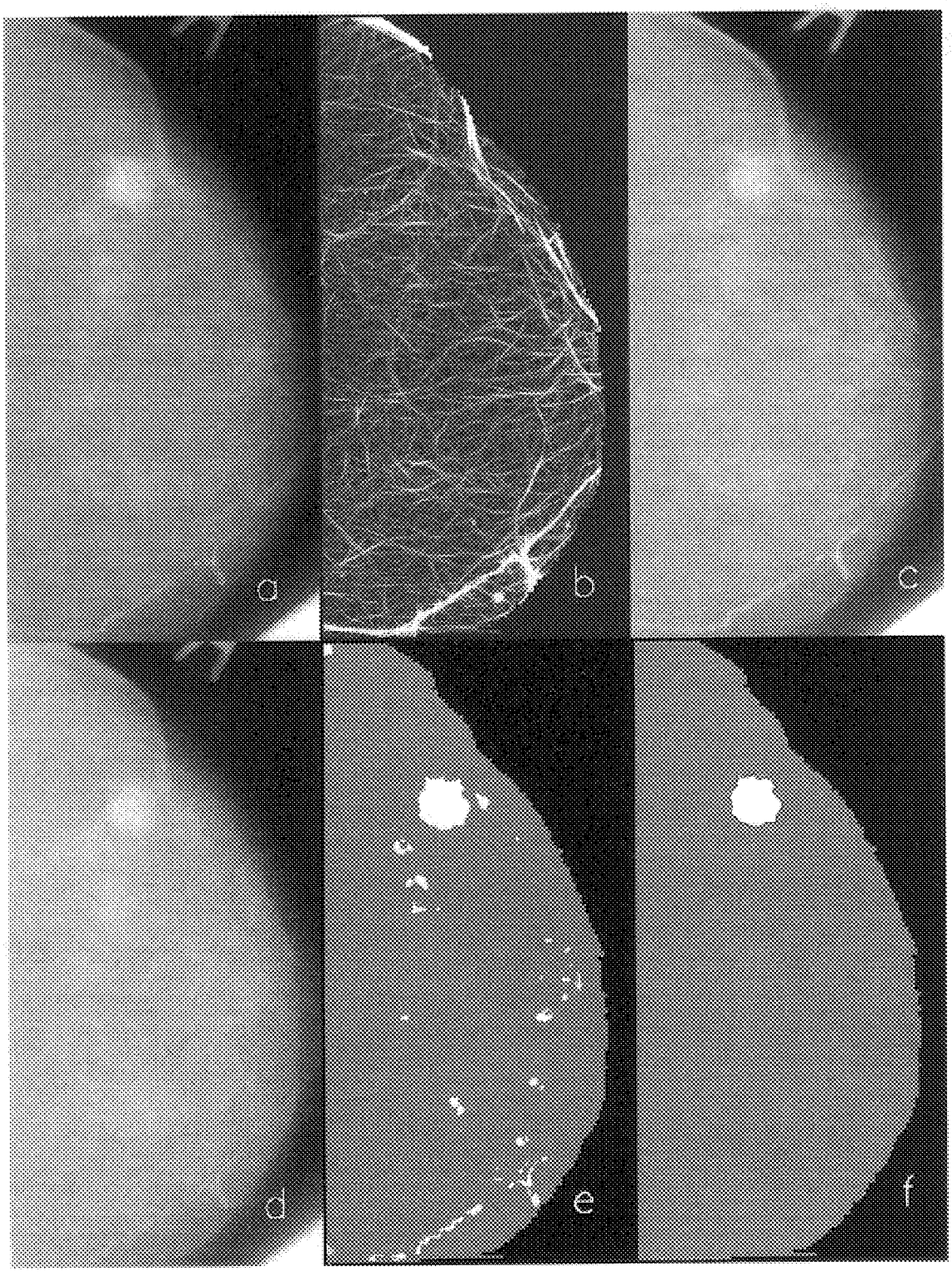
FIG. 8 illustrates the output of some of the CAD modules for a circumscribed lesion: (a) representative raw digitized mammogram; (b) directional features computed by the DWT (CAD module 2); (c) enhanced mammogram obtained by adding direction features to the noise-suppressed image (CAD module 4); (d) smoothed image obtained by subtraction of directional features from the noise-suppressed image; (e) segmented image showing the suspicious areas using CAD module 3; (f) final detected mass without the presence of speculations and false positives using modules 1–5.

Referring to FIGS. 7 and 8, for the input mammographic image f(i,j), three output images are obtained from the feature decomposition by directional wavelet analysis, namely, a directional feature image to allow feature extraction, a directional-feature-enhanced image created by adding directional features to the noise-suppressed image, and finally, a smoothed image obtained by subtraction of directional features from the noise-suppressed image as shown in FIGS. 7 and 8, subparts (b), (c), and (d), respectively.

The directional texture image is expressed as $$f' = (x, y) = \sum_{i=1}^{N} W_i \left( \sum_{j=1}^{K} W_j^i \Psi_j^i (f(x, y)) \right) \quad (19)$$

where $\Psi^i(*)$ refers to the output of a wavelet transform at direction i and resolution j; $W_i$ and $W_j^i$ are the weights for the adaptive combiners (see FIG. 6).

The enhanced-image version of the original noise-suppressed image is expressed as:

$$\hat{f}(x,y) = f(x,y) + \alpha f'(x,y) \quad (20)$$

The smoothed-image version of the original noise-suppressed image is expressed as:

$$\bar{f}(x,y) = f(x,y) - f'(x,y) \quad (21)$$

in which the directional texture information was removed. The directional features are used as input to CAD module 4, and the smoothed image with directional features removed is used as input to CAD module 3, as shown in FIG. 1

3. CAD Module 3. Multiresolution Segmentation of Suspicious Areas

Image segmentation is an image decomposition in which the image is decomposed into spatially separated components (Jain, 1989). The pixels in each component have certain similarity in their features, e.g., gray level. Two major techniques for image segmentation are the boundary-based approach and the region-based approach. In the boundary-based approach, boundary information is determined based on edge detection. The main idea in region-based segmentation is to identify various regions in an image that have similar features.

For mammographic images, the boundary of a mass is frequently difficult to determine by edge detect on because of the low contrast of the images and the ill-defined edges for many malignant masses. In contrast, the region-based segmentation method is more suitable for segmentation because the pixels within a suspicious area will generally have more uniform intensity and are often brighter than the surrounding tissue. However, the suspicious areas are imbedded in a nonuniform background signal due to surrounding tissue and fat of varying thickness, giving varying X-ray attenuation. To develop an automatic segmentation method for application to the full mammogram, some form of selective image enhancement of the suspicious areas relative to the background is required prior to segmentation.

We use the multiresolution wavelet transform, originally developed by Mallat (1989b), as a basis for the image enhancement of suspicious areas in digital mammograms. The Daubechies 16-wavelet transform is used, where image decomposition into subimages using an M-channel tree-structured wavelet transform is implemented on quadrature mirror filter banks (QMFs), by way of example (Qian et al., 1993, 1995a). The M-channel wavelet transforms implemented on QMFs preserve the properties of near-perfect reconstruction and allow higher-order M transform ($M^2$) subimages to be considered for more selective image enhancement.

Qian et al. have previously used an M=2 channel tree-structured wavelet transform (TSWT) for selective image enhancement of microcalcification clusters in digital mammography, preceded by an adaptive multistage nonlinear filter (AMNF) (Qian et al., 1995b). The theoretical basis for the M-channel TSWT (M=2,4,8, . . . ) and implementation on different filter banks including QMFs has been described (Qian et al., 1994b, 1995a,b). Herein the M-channel TSWT is utilized for selective enhancement of suspicious areas, implemented on QMFs (Qian et al., 1994b).

Selective reconstruction of the $M^2$ subimages is proposed for image enhancement of suspicious areas. Higher-order M channels are used to provide improved image enhancement relative to the background signal, as may be required for the varying gray-scale characteristics of different digital sensors, that is, by more selective reconstruction of the higher-order $M^2$ subimages. Such selective reconstruction of the subimages is currently obtained by visual criteria and the use or a training data set with known ground truth (masses of varying types), that is, selection of images where parenchymal tissue structure is observed to be similar to that of the masses and the removal of subimages that contain background information.

For higher-order M channels (M=4), visual selection may prove to be a prohibitively, time-consuming task. We believe that an adaptive selection of subimages may be possible by a selection of appropriate features in each subimage and the use of related correlation and energy function criteria within subimages (Qian et al., 1995b).

Adaptive clustering (AC) is a generalization of a conventional clustering method such as a K-means method. It is made to adapt to changes in characteristics from pixel to pixel in the same image and changes in statistical properties from image to image. The clustering criteria of the AC algorithm consist of two elements: the distance (measured by mean-square error) of the pixel intensity to the cluster centroid and the neighbor constraint, which is based on the Gibbs density distribution. Because the clustering centroid is calculated based on a sliding window instead of the whole image, such as that in the K-means algorithm, it is made adaptive to local characteristics. Also, because a different constraint coefficient is taken based on the standard variance of the image, it is made adaptive to different images.

Adaptive clustering is an iterative procedure beginning with an initial segmentation. With the iteration of the algorithm the segmentation obtained by adaptive clustering is statistically an approximation of the maximum posterior estimation (Pappas et al., 1992).

In summary, CAD module 3 involves three steps: A simple adaptive thresholding method (Kohler, 1981) is used to segment the full mammogram image into breast tissue and background area (exposed region of film beyond breast boundary). The M-channel TSWT method for image enhancement is applied using the smoothed image (output of CaD module 2). Adaptive clustering, applied to the enhanced image, is used automatically segment the image into suspicious regions, which becomes the input to CAD modules 5 and 6. The overall objective is to preserve image details of the segmented regions to improve shape-related features similar to the ACR BIRADS (American College of Radiology, 1993) for all mass types.

4. Directional Feature Analysis: CAD Modules 4

Many breast carcinomas have the mammographic appearance of a stellate lesion. Spiculation is the most important directionally related feature in mammogram interpretation. It plays a key role in distinguishing among different mass types (circumscribed versus spiculated) and between benign and malignant masses.

In order to improve the definition of spiculations in an image, a tracing algorithm was designed to extract the spicules and differentiate speculations from other directional features. This algorithm consists of two subtracing procedures: contour tracing of an extracted region and spicule tracing. These procedures were applied to the segmented suspicious areas output by CAD module 3 and the directional feature images obtained from the feature decomposition performed by CAD module 2.

For spiculated lesions, the extracted spiculations are then added to the segmented mass, which permits an improved visual diagnosis of the extent and/or presence of cancer within the breast. For masses that are circumscribed or irregular, no spiculations are generally found. However, for all mass types the directional features are first removed for the purpose of segmentation and then added back in order to visually evaluate the segmented mass. The method, therefore, can be applied to images irrespective of mass type.

The ray-tracing algorithm proceeds as follows:
Contour tracing loop (image from CAD module 3):
Step 1: Locate the initial edge point of the extracted region.
Step 2: Determine the maximum feature direction, maximum feature intensity, and average feature intensity of eight directional features;
Step 3: If:
  (1) the feature intensity is greater than a threshold $I_1$; and
  (2) the difference between this feature intensity and the average intensity is greater than a threshold $I_2$; and
  (3) the difference between the maximal feature direction and the orientation of the pixel position relative to the center of the region is less than a threshold $I_3$; and
  (4) the preceding edge point is not a pixel on the spicule detected;
    then go to the spicule tracing loop;
    otherwise, no spicule originating from this pixel exists and continue;
Step 4: Mark the edge point and search for the next neighborhood edge point;
Step 5: If all pixels on the contour have been visited, stop. Otherwise, go to Step 2.
Spicule tracing loop (image from CAD module 2):
Step 0: Initialization (only for the first step in search of each spicule) to determine the search direction for a spicule based on (a) the maximum feature direction of present pixel, (b) the position of the region center relative to the initial point;
Step 1: Choose the pixels in the neighborhood of the present pixel as a candidate for spicule pixels if (a) they are located in the search direction relative to the present pixel, and (b) their maximum feature directions are within [i−1,i+1], where i is the maximum direction of the present spicule pixel.
Step 2: If the direction feature intensity of the candidate pixel is (a) the maximum among the candidate pixels, and (b) greater than the threshold $i_1$, then it is marked as the next pixel on the spicule line, and go to step 1; otherwise, go to step 3.
Step 3: Stop and return to the contour tracing loop.

Analysis of Spiculations. The ray-tracing algorithm provides a direct measure of the number of spiculations, their length, and distribution and is thus an improved method for analyzing spiculations on spiculated masses. It is our belief that the above method can be readily extended to measure the thickness or morphology of the spiculations in addition to their length using, for example, a modified gray-scale seed-growing method.

5. Mass Detection and Classification: CAD Modules 5 and 6

CAD modules 5 and 6 perform the detection and classification of masses. They are described here to demonstrate, by way or example, how the image-processing CAD modules 1–4 in FIG. 1 allow an improvement in how features are computed in the gray-level, morphological, and directional texture domains. Representative features will be identified below. Feature-selection methods to obtain the optimum number of features are not described, as they are not impacted by the preprocessing CAD modules. These methods are described in published textbooks (DeVijver et al., 1982) and may include successive elimination or sequential backward selection methods (Chan et al., 1995; Lo et al., 1995). The proposed subgroups of features are listed in accordance with the American College of Radiology (ACR) Lexicon criteria (mass shape, margins, and density-related features, and can be applied for mass detection, classification, or both.

Representative Features for Mass Detection and Classification:

Shape Analysis. Shapes listed in the ACR Mammography Lexicon include those that can be defined as round, oval, lobulated, or irregular, and such shape features may be helpful in mass detection and classification (Wu et al., 1993). Shape models can be applied to the segmented suspicious areas (CAD module 3) as follows:

(1) Fitness model: Brazakovic et al. (1990) proposed a signature model based on the round/oval gross shapes using periodic sinusoidal/cosinusoidal functions. The fitness of the model is defined as the minimized error between the model and mass using a least-squares metric (Brazakovic et al., 1990, Eq. 8–12).

(2) Ratio of semiaxes: The ratio of the semiaxes of the above optimized model can be used as a feature parameter, as an indicator of roundness of the mass (Brazakovic et al., 1990, Eq. 11, 12).

(3) Tumor boundary Irregularity factor: A more detailed measure of mass boundary to listinguish cases of microlobulated or indistinct margins is possible; this may be useful for detection but particularly for classification. The irregularity metric is the variation in radial length at different boundary points, as proposed by Kilday et al. (1993, Eq. 5).

(4) Fractal dimension actor: The fractal dimension is used as a measure of the roughness of the mass intensity surface proposed for mass detection (Burdett et al., 1993). In all instances, we believe that segmentation of the suspicious areas, with improved image detail, improves the usefulness of the shape-related features for mass detection and classification.

Mass Margin Analysis. Mass margin analysis may be applied both to spiculations and to the central mass. The fuzziness of central mass margins can be used for classifying a probability of malignancy (Parr et al., 1994). Features that can be used include:

(1) Number of spiculations. The number is computed based on spiculations with a length exceeding a given threshold (Karssemeijer, 1994).

(2) Average speculation length. This feature is computed by summing the lengths of all detected spiculations (i.e., those consisting of pixels exceeding a given intensity threshold), normalized to the area of the mass.

(3) Spiculation angular distribution. The angular distribution of spiculations around the mass is computed as an entropy (E) (Claridge et al., 1994; Karssemeijer, 1994). For example, the angular distribution can be described as:

$$E = -\sum P_i \log P_i,$$

where $P_i = \dfrac{n_i}{N}$, $N = \sum n_i$ $(i = 1, 2, \ldots 16)$ (4) Margin analysis of the central mass. The fuzziness of mass margins has been measured (Brzakovic et al., 1990; Kilday et al., 1993), and an average edge gradient around the edge of the mass can be computed (Huo et al., 1995; Li et al., 1995, submitted).

In all instances, we believe that a more direct extraction of spiculations as disclosed in the proposed invention improves mass detection and classification.

Mass Density Analysis. Mass density is also an important feature for both detection and classification (Giger et al., 1994b; Wu et al., 1993), and these features can be computed from the outputs of CAD modules 1 and 3 in FIG. 1.

(1) Density uniformity. This is a measure of the smoothness of the pixel intensity within the mass boundary (Giger et al., 1994b).

(2) Relative density. The relative average density of the mass (Mt) relative to a region of interest in the surrounding tissue (Ms) is also important for detection and classification (Giger et al., 1994b; Wu et al., 1993), and is determined as the difference in density normaltzed to Ms: (Mt−Ms)/Ms. We believe that an improved delineation of the suspicious area's boundaries improves the computation of mass density and relative density features.

Classification Methods. The classification methods for mass detection (differentiation of mass and normal tissue) and mass classification (differentiation of benign and malignant) are described below. The results for mass detection using specific algorithms such as the fuzzy binary decision tree (FBDT) are also described for the proposed apparatus.

Mass Detection CAD Modules 5. We have used the fuzzy binary decision tree (FBDT) for mass detection (Li et al., 1995, submitted) in the disclosed method. The FBDT was discovered by an empirical selection of features using physician knowledge, where the tests in each of the nodes of the decision tree can be related to thresholds of the measurements (Li et al., 1995).

The FBDT, although very flexible in design, may provide suboptimal results if exact features are not used for training. The use of a backpropagation neural network (NN) has been proposed for mass detection and classification (Wu et al., 1993; Giger et al., 1994b; Lo et al., 1995). NNs allow complex nonlinear decision boundaries, as opposed to axis parallel discriminant surfaces generated by decision trees, and are generally noise tolerant (Bezdek et al., 1993). The use of KF for backpropagation training, in turn, simplifies the NN structure and improves convergence rate and stability, with up to 100 times more efficiency in training dependent on the complexity of input features from the digital mammography, as described previously for microcalcification detection (Zheng and Qian et al., 1995).

The use of a three-layer BPNN is suitable for this work, with a similar structure to that proposed by Clarke et al. (1994). The input node number of the proposed BPNN depends on the feature selection, while the hidden node number is optimized with training data set. The output of the outcut node corresponds to the detection of mass. The generalization capabilities of the neural network can be evaluated using the leave-one-out method on a training database as well as the application to a test database. To do the evaluation, computed ROC curves can be generated by varying the threshold of the output node of the NN (Lo et al., 1995).

Mass Classification CAD Modules 6. The classification of a mass as benign or malignant from image data is a more difficult task compared with a visual rating by an expert radiologist of the degree of malignancy (Wu et al., 1993). It is believed that the direct detection of spiculations and their associated characteristics will greatly improve classification accuracy, as suggested by other investigators (Kegelmeyer et al., 1994; Huo et al., 1995). No particular distinction will be made between benign and malignant spiculated lesions, as this topic is beyond the scope of the proposed invention and is statistically not very significant. Patient age and other factors may be included as inputs to the classification methods.

Since the proposed NN needs to determine the probability of whether the mass is malignant or benign, a probabilistic neural network (PNN) is proposed by way of example (Specht, 1990). The PNN has a similar structure as BPNN. It is also a multistage feed-forward network.

The PNN consists of four layers: input units, pattern units, summation units, and output units. The PNN, however, is based on Bayes estimation theory and the Parzen PDF estimation method (Parzen, 1962). The output of the summation unit corresponds to a probability density, where weights may be systematically changed to generate computed ROC curves similar to the BPNN by changing the threshold. The weights of the PNN are computed in a single pass rather than with an iterative search for convergence and is therefore computationally efficient and suitable for both feature selection and the traditional jackknife method for error analysis relating to the training image database. Note that the shame of the decision surface can be made as complex as necessary by adjusting parameters, while maintaining sample error tolerance as required for the different problem of mass classification.

6. Medical Workstation: Module 7

Figure 10:
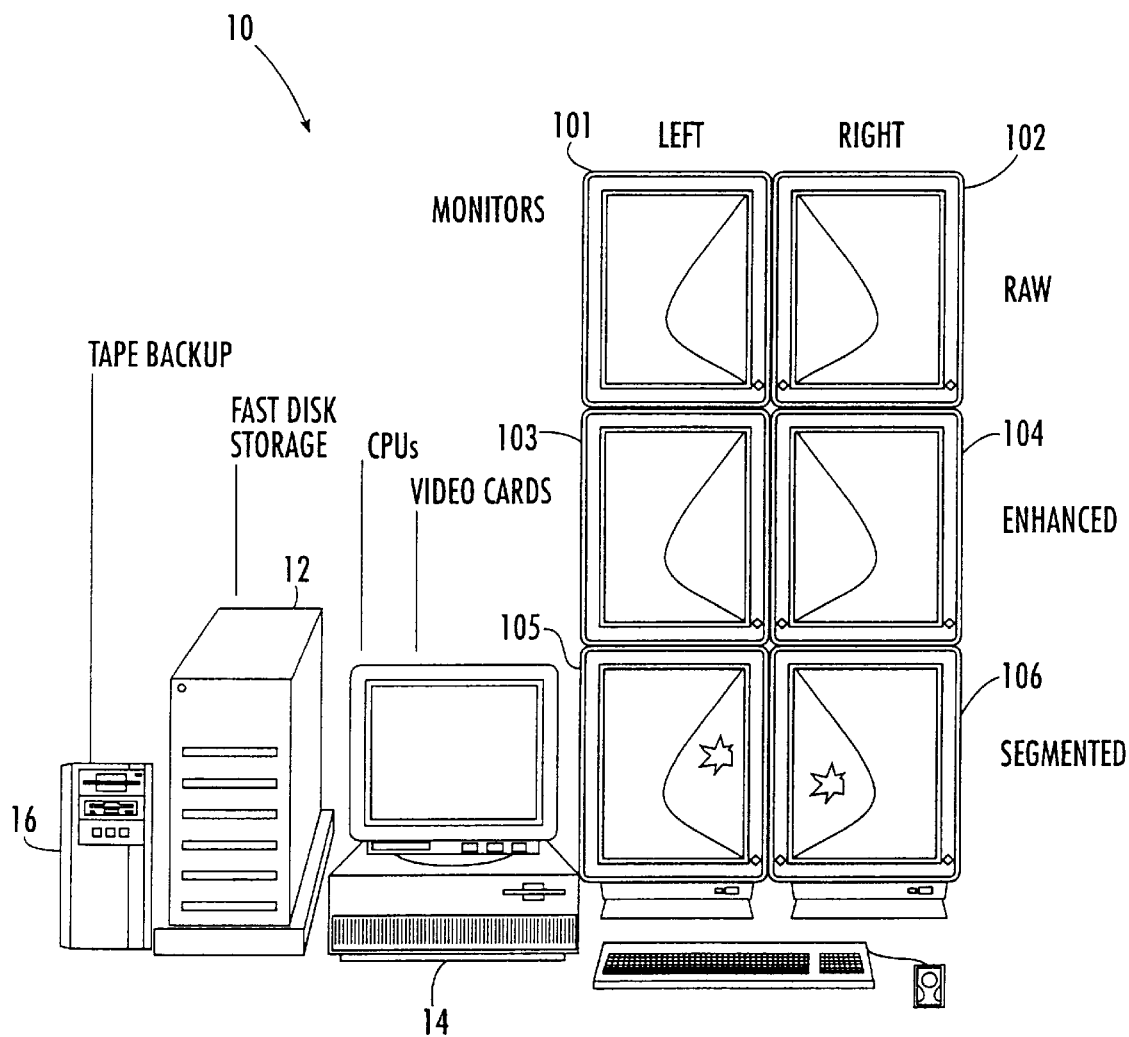
FIG. 10 is a front perspective view of an exemplary medical workstation showing an array of monitors to allow visual inspection of the raw, enhanced, and segmented images of the left and right breast. An insert in the segmented image provides the classification probability (benign or malignant).

The proposed medical workstation 10, in an exemplary embodiment, includes the use of three pairs 101,102; 103, 104; and 105,106 of high-resolution, high-luminance computer monitors suitable for gray-scale interpretation of digital mammograms, as shown in FIG. 10. The medical workstation 10 includes fast disc storage arrays 12 and the necessary hardware 14 to display images of the order of 5 Mbytes or better, as required for digital mammography. Also illustrated is a tape backup unit 16.

The proposed method and apparatus would employ software for fully operator-independent review of the images; that is, each CAD module requires no operator input for the analysis of mammograms by a physician.

It is our belief that the operator-independent nature of the image review process will reduce the inter- and intraoperator variability in reading mammograms at either a central reading location or any remote location where the same or a compatible workstation is available. Similarly, it is our belief that the image enhancement, coupled with segmentation of the masses, at least partly compensates for the performance of the monitor and may allow low-end monitors to be used for remote diagnosis as required for referring physicians. Similarly, it is cur belief that segmentation of the suspicious masses, as opposed to prompts on the original image, reduces the disturbing or distracting effect of the presence of false positives, which may be visually rejected based on their location and segmented shape.

7. Exemplary Results

A series of experiments was designed for mass detection using modules 1–5 in order to explore the effectiveness of the proposed method and apparatus.

Directional Wavelet Transform: Modules 2. To simplify the implementation, the directional wavelet analysis was implemented with a single scale (s=1) and eight directions (N=8). In this case, the directional wavelet transform is equivalent to a directional high-pass filtering. The orientations θ of eight directional wavelet functions are taken as π(I−1)/8 (I=1,2, . . . ,8). The parameter $\sigma_1$ is chosen to be 2, with which the 3-dB orientational bandwidth of the wavelet function is approximately π/8. The choice of the parameter $\sigma_2$ depends on the characteristics of directional texture features in the mammogram. It is chosen here in such a way that the spiculated features can be extracted effectively, and was determined empirically.

Figure 6:
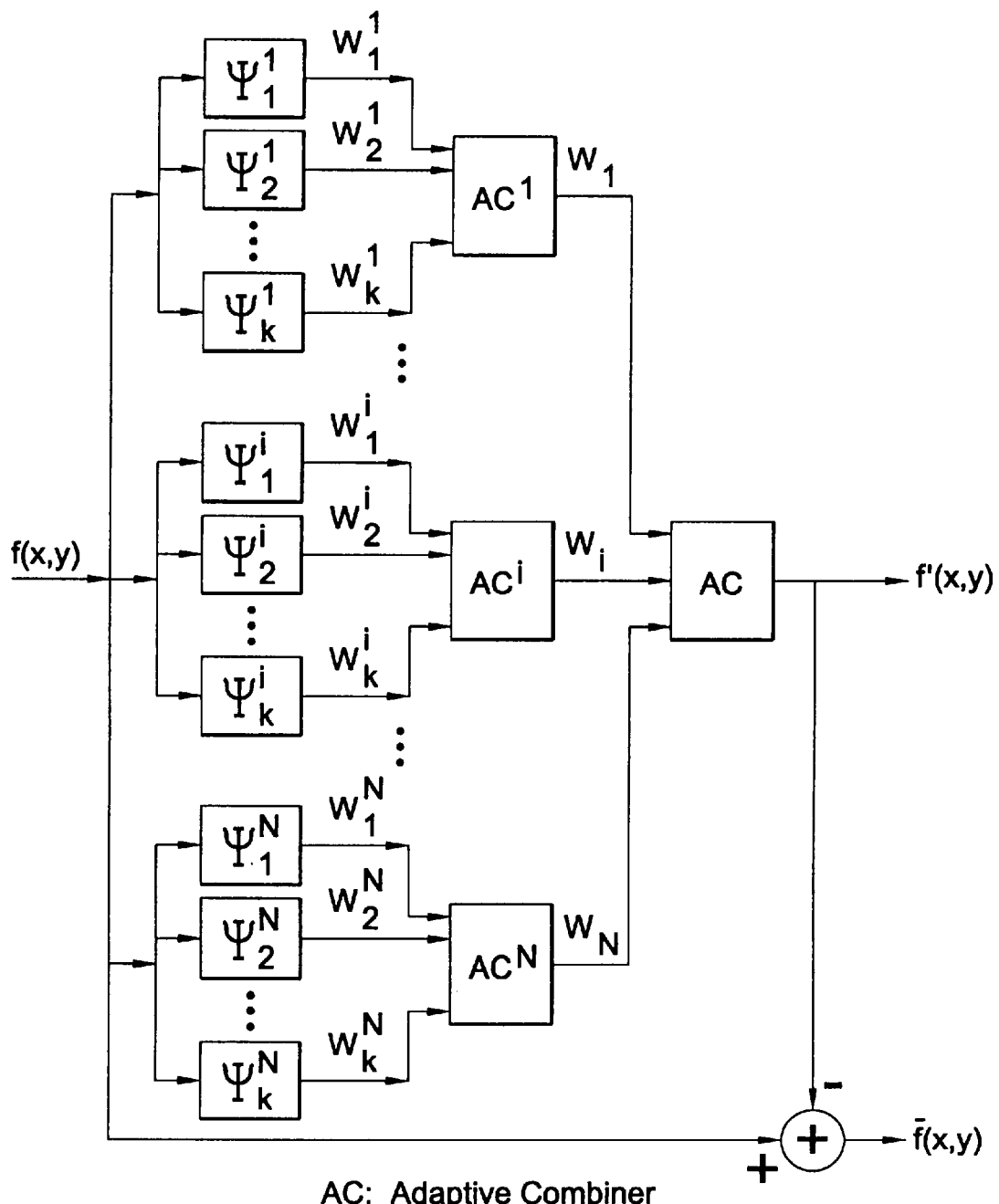
FIG. 6 is a block diagram showing image feature decomposition, using the DWT and an adaptive combiner.

The weighs $w_i$, i=1,2, . . . ,8, for the adaptive combiner varies with the outputs of the DWTs, as illustrated in FIG. 6. The weight vector $W=[w_1,w_2,\ldots,w_i,\ldots,w_8]^T$ will take the value $W=[0,0,\ldots,1,\ldots,0]^T$, where all the elements are 0 exceot that the i-th element equals 1, if the output of the i-th DWT is maximum among all outputs. In other words, the adaptive combiner used is a maximum value selector. After the feature decomposition, an M=2 channel WT-based multiresolution image enhancement was conducted on the smoothed image. The wavelet transform was implemented by a pair of quadrature mirror filters (QMF). The filter coefficients used here are 16-tap Daubechies wavelet coefficients (Daubechies, 1990). Adaptive clustering was the used to segment the suspicious areas. The fuzzy binary decision tree was used to classify mass and normal tissue structures. Representative results are shown in FIGS. 7 and 8 for a spiculated mass and a circumscribed mass. For the spiculated mass, the detected mass is segmented with the spiculations for better visual interpretation, that is, allowing the false positives to be readily recognized visually. The results are shown for the circumscribed mass to demonstrate that the apparatus can be used for all mass types.

Figure 9:
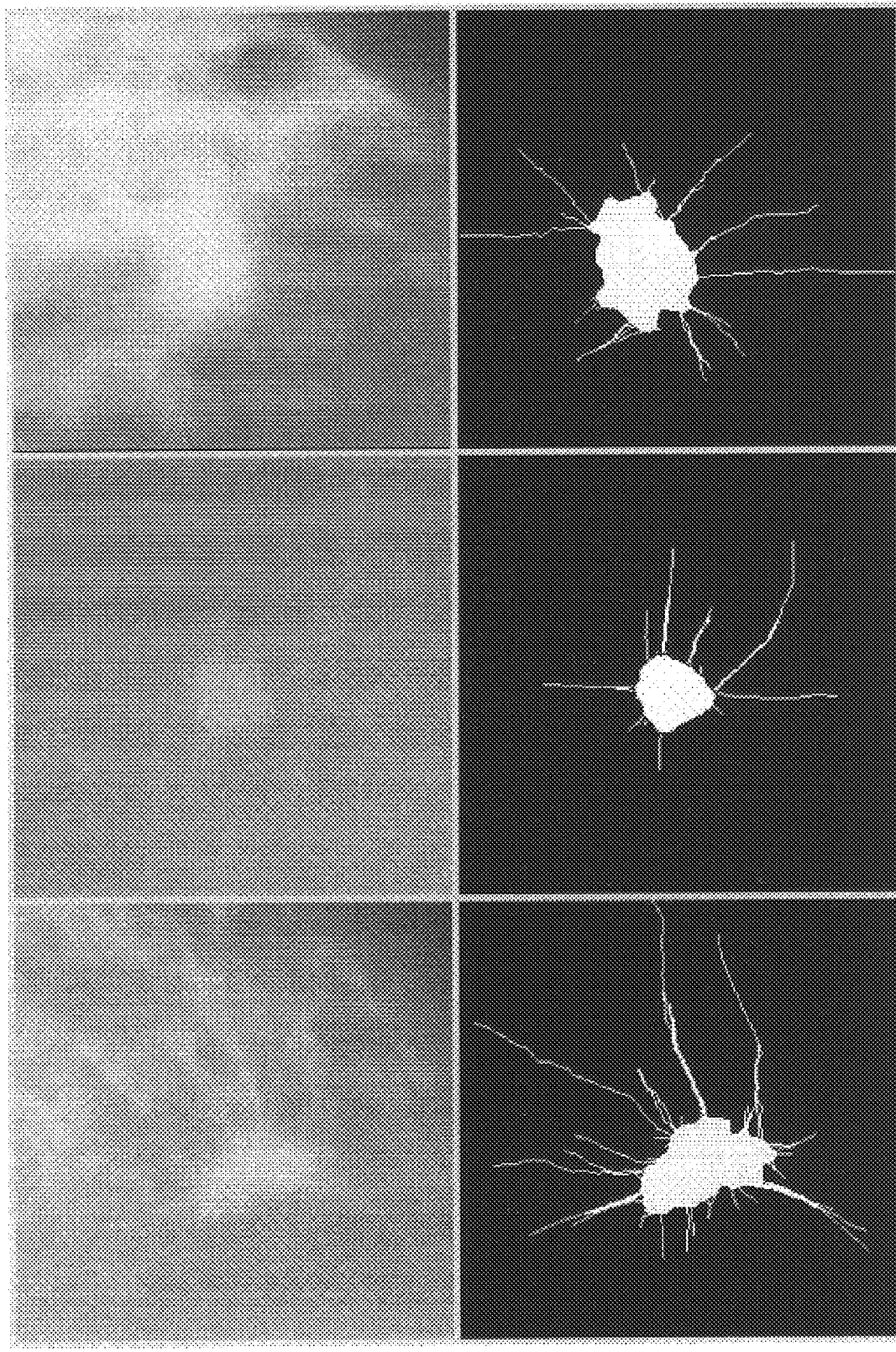
FIG. 9 illustrates representative results for three cases with spiculated masses with varying size and image contrast: (a–c) subimages of the raw image data; (d–f) masses segmented with spiculations.

Referring to FIG. 9, there are shown three stellate masses and their spiculations extracted and added to the mass boundary. The morphological and gray-level features are computed based on the mammograms with directional features removed.

Analysis of an Image Database: Retrospective Case Study. To test the performance of the proposed mass detection method, an image database was used (Li et al., 1995) that zontained fifty normal and forty-five abnormal mammograms. Both normal and abnormal mammograms manifest typical variations in parenchymal density and structure, ranging from very dense to fat breasts. Various metrics were computed to reflect the selection of difficult cases, as published by these investigators (Li e; al., 1995).

The abnormal mammograms contained at least one tumor of varying size and location. In toto there are 20 stellate, 13 circumscribed, and 15 irregular masses included in the image data set. These mammograms were obtained from a screen/film system, and the films were digitized by a DuPont FD-2000 digitizer (MINDAX Corporation). The image resolution was 220 μm and 8 bits (256 gray levels) per pixel within the optical density of 0–3.5. A reference image or truth file was formed for each abnormal mammogram, where the tumor was labeled by an expert mammographer based on visual criteria using screen/film and biopsy results.

The results using the detection algorithm, in this case the fuzzy binary decision tree, is reported by way of example. It was first trained with a separate image database containing twenty mammograms selected from the previous image data set to obtain the parameters for feature extraction and classification. Five mammograms with a circumscribed mass, seven with a stellate mass, five with an irregular mass, and three with no mass (i.e., normal) were included. The sensitivity of detection is defined as the ratio of the number of suspicious areas being correctly extracted from the images to the total number of suspicious areas.

The experimental results demonstrate that the proposed method is very effective. The sensitivity of detection for the method was high at 98%, while maintaining a low false positive (FP) detection rate of 1.4 FPs per image. The only mass that was missed was a very large circumscribed mass (area greater than 140×140 pixels), which was very different from the selected masses in the training data set. The method performed particularly well for masses with spiculated lesions or for those masses that were highly connected to surrounding parenchymal tissues.

Throughout this disclosure, various publications are referenced. Full citations for the publications are listed below. The disclosures of these publications in their entireties are hereby incorporated by reference into this application in order to more fully describe the state of the art to which this invention pertains.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus and method illustrated and described herein are by way of example, and the scope of the invention is not intended to be limited to the exact details of construction or practice.

REFERENCES

ACR Breast Imaging Reporting and Data System, Reston, Va.: American College of Radiology, 1993.

Adler, D. D., and R. L. Wahl, "New methods for imaging the breast: Techniques, findings and potential," *AJR* 164, 19–30, 1995.

Astley, S. C., Taylor, C. Boggis, D. Asbury, and M. Wilson, "Cue generation and combination or mammographic screening," Chapter 13, *Visual Search*, Taylor and Francis Ltd., pp. 207–23, 1993.

Barman, H., and G. H. Granlund, "Computer aided diagnosis of mammograms using a hierarchical framework," *Digital Mammography*, A. G. Gale et al., eds., Elsevier Science B.V., 1994.

Barman, H., G. H. Granlund, and L. Haglund, "Feature extraction for computer-aided analysis of mammograms," *International Journal of Pattern Recognition and Artificial Intelligence* 7(6), 1993.

Bezdek, J. C., L. O. Hall, and L. P. Clarke, "Review of MR image segmentation techniques using pattern recognition," *Med. Phys.* 20(4), 1033–48, 1993.

Bouman, C., and B. Liu, "Multiple resolution segmentation of texture images," *IEEE Trans. on Pattern Analysis and Machine Intelligence* 13(2), Feb. 1991.

Brzakovic, D., S. M. Luo, and P. Brzakovic, "An approach to automated detection of tumors in mammograms," IEEE Trans. Medical Imaging 9, 233–41, 1990.

Burdett, C. J., H. D. Longbotham, et al., "Nonlinear indicator of malignancy," Proc. SPIE 1905, 853–60, 1993.

Cerneaz, N., and M. Brady, "Enriching digital mammogram image analysis with a description of the curvilinear structures," Digital Mammographv, A. G. Gale et al., eds., Elsevier Science B.V., 1994.

Chakraborty, D. P., "Maximum likelihood analysis of free-response receiver operating characteristic data," Med. Phys. 16(4), 561–68, 1989.

Chan, H. P., D. Wei, M. A. Helvie, B. Sahiner, D. D. Adler, M. M. Goodsitt, and N. Petrick, "Computer-aided classification of mammographic masses and formal tissue: Linear discriminant analysis in texture feature space," Phys. Med. Biol. 40, 857–76, 1995.

Claridge, E., and J. H. Richter, "Characterization of mammographic lesions," Digital Mammography, A. G. Gale et al., eds., Elsevier Science B.V., 1994.

Clarke, L. P., B. Zheng, and W. Qian, "Artificial neural network for pattern recognition in mammography," invited paper, World Congress on Neural Networks, San Diego, Calif., Jun. 4–9, 1994.

Daubechies, I., "The wavelet transform, time-frequency localization and signal processing," IEEE Trans. on Information Theory 36(5), September 1990.

DeVijuer, P. A., and J. Kittler, Pattern Recognition: A Statistical Approach, London: Prentice Hall International, 1982.

Giger, M. L., "Computer-aided diagnosis," RSNA Syllabus: A Categorical Course in Physics, Technical Aspects of Breast Imaging, eds. A. G. Haus, M. J. Yaffe, 283–98, 1993.

Giger, M. L., P. Lu, Z. Huo, U. Bick, C. J. Vyborny, R. A. Schmidt, W. Zhang, C. E. Metz, D. Wolverton, R. M. Nishikawa, W. Zouras, and K. Doi, "CAD in digital mammography: Computerized detection and classification of masses," Digital Mammography, A. G. Gale et al., eds., Elsevier Science B.V., 1994b.

Giger, M. L., C. J. Schmidt, and R. A. Schmidt, "Computerized characterization of mammographic masses: analysis of spiculation," Cancer Letters 77, 201–11, 1994a.

Giger, M. L., F. F. Yin, K. Doi, C. E. Metz, R. A. Schmidt, and C. J. Vyborny, "Investigation of methods for the computerized detection and analysis of mammographic masses," Proc. SPIE 1233, 183–84, 1990.

Grossmann, A., and J. Morlet, "Decomposition of Hardy functions into square integrable wavelets of constant shape," SIAM J. Math. 15, 723–36, 1984.

Gupta, R., and P. E. Undrill, "The use of texture analysis to delineate suspicious masses in mammography," Pays. Med. Biol. 40, 835–55, 1995.

Hand, W., J. L. Semmlow, L. V. Ackerman, and F. S. Alcorn, "Computer screening of xeromammograms: A technique for defining suspicious areas of the breast," Computer Biomedical Research 12, 445–60, 1979.

Hoyuer A., and W. Spiesberger, "Computerized mammogram processing," Phillips Technical Review 38, 347–55, 1978/79.

Huo, Z., M. L. Giger, C. J. Vyborny, et al., "Analysis of spiculation in the computerized classification of mammographic masses," Medical Physics 22(10), 1569–79, 1995.

Jain, A. K., Fundamentals of Digital Image Processing. Prentice Hall, Englewood Cliffs, 1989.

Karssemeijer, N., "Recognition of stellate lesions in digital mammograms," Digital Mammography, A. G. Gale et al., eds., Elsevier Science B.V., 1994.

Kegelmeyer, W. P., "Computer detection of stellate lesions in mammograms," Proc. of SPIE 1660, 440–54, 1992.

Kegelmeyer, W. P., J. M. Pruneda, P. D. Bourland, A. Hillis, M. W. Riggs, and M. L. Nipper, "Computer-aided mammographic screen for speculated lesions." Radiology 191, 331–37, 1994.

Kilday, J., F. Palmieri, and M. D. Fox, "Classifying mammographic lesions using computerized image analysis," IEEE Trans. on Medical Imaging 12(4), 1993.

Kimme, C., B. J. O'Loughlin, and J. Sklansky, "Automatic detection of suspicious abnormalities in breast radiographs," in: A. Klinger, K. S. Fu, and T. L. Kunii, eds., Data structures, computer graphics, and pattern recognition, New York: Academic Press, pp. 427–47, 1975.

Kohler, R. A., "Segmentation system based on thresholding," CGIP 15, 319–38, 1981.

Lai, S. M., X. Li, and W. F. Bischof, "On techniques for detecting circumscribed masses in mammograms," IEEE Trans. Medical Imaging 8, 337–86, 1989.

Laine, A., S. Schuler, J. Fan, and W. Huda, "Mammographic feature enhancement by mult-scale analysis," IEEE Trans. on Medical Imaging 13(4), December 1994.

Laine, A. T., S. Schuler, J. Fan, and W. Huda, "Mammographic Feature Enhancement by Multiscale Analysis," IEEE TMI 13(4), 725–40, 1995.

Lau, T., and W. F. Bischof, "Automated detection of breast tumors using the asymmetry approach," Computers and Biomedical Research 24, 273–395, 1991.

Li, H., M. Kallergi, L. P. Clarke, V. K. Jain, and R. A. Clark, "Markov random field for tumor detection in digital mammography," IEEE Trans. Medical Imaging 14(3), 565–76, September, 1995.

Li, L., W. Qian, L. P. Clarke, and R. A. Clark, "Digital mammography: Directional wavelet analysis for feature extraction and mass detection," IEEE Trans. on Medical Imaging (submitted).

Lo, J. Y., J. A. Baker, P. J. Kornguth, and C. E. Floyd, Jr., "Computer-aided diagnosis of breast cancer: Artificial neural network approach for opthmized merging of mammographic features," Academic Radiology 2, 841–50, 1995.

Mallat, S., "Multifrequency channel decompositions of images and wavelet models," IEEE Trans. or Acoustic, Speech, and Signal Processing 37(12), 1989a.

Mallat, S., "A theory for multiresolution signal decomposition: The wavelet representation," IEEE Trans. on Pattern Analysis and Machine Intelligence 11(7), July, 1989b.

Mallat, S., and Zhong, "Characterization of signals from multiscale edges," IEEE Trans. PAMI, July, 1992.

Metz, C. E., "ROC methodology in radiologic imaging," Invest. Radiol. 21, 720–33, 1986.

Metz, C. E., "Some practical issues of experimental design and data in radiological ROC studies," Invest. Radiol. 24, 234–45, 1989.

Miller, P., and S. Astley, "Automated detection of mammographic asymmetry using anatomic features," International Journal of Pattern Recognition and Artificial Intelligence 7(6), 1993.

Pappas, T. N., "An adaptive clustering algorithm for image segmentation," IEEE Trans. on Signal Processing 40(2), April 1992.

Parr, T., S. Astley, and C. Boggis, "The detection of stellate lesions in digital mammograms," *Digital Mammography*, A. G. Gale et al., eds., Elsevier Science B.V., 1994.

Parzen, E., "On estimation of a probability density function and mode," *Ann. Math. Stat.* 33, 1065–76, 1962.

Petrick, N., H. P. Chan, B. Sahiner, D. Wei, M. A. Helvie, M. M. Goodsitt, and D. D. Adler, "Automated detection of breast masses on digital mammograms using a convolution neural network for morphological and texture classification," *Proc. of World Congress on Neural Networks* 2, 872–75, 1995.

Petrosian, A., H. P. Chan, M. A. Helvie, M. M. Goodsitt, and D. D. Adler, "Computer-aided diagnosis in mammography: Classification of mass and normal tissue by texture analysis," *Physics in Med. Biol.* 39, 2273–88, 1994.

Qian, W., L. P. Clarke, et al., "Tree-structured nonlinear filter and wavelet transform for microcalcification segmentation in mammography," *Proc. of the IS&T/SPIE Annual Symposium on Electronic Imaging*, Science & Technology, San Jose, Calif., 1993.

Qian, W., L. P. Clarke, M. Kallergi, and R. A. Clark, "Tree-structured nonlinear filters in digital mammography," *IEEE Trans. on Medical Imaging* 13(1), March 1994a.

Qian, W., L. P. Clarke, et al., "Digital mammography: m-Channel quadrature mirror filters for microcalcification extraction," *Computerized Imaging and Graphics* 18(5), 301–14, September/October, 1994b.

Qian, W., L. P. Clarke, M. Kallergi, B. Zheng, and R. A. Clark, "Wavelet transform for computer assisted diagnosis (CAD) for digital mammography," *IEEE Engineering in Medicine and Biology Magazine*, Invited Paper, 14(5), 561–69, 1995b.

Qian, W., M. Kallergi, L. P. Clarke, H. D. Li, R. A. Clark, and M. L. Silbiger, "Tree-structured nonlinear filter and wavelet transform for microcalcification segmentation in digital mammography," *Med. Phys.* 22(8), 1247–54, 1995a.

Richardson, W. B., "Wavelet packets applied to mammograms," *Proc. of the SPIE/IS&T Symposium on Elecoronic Imaging Science and Technology*, San Jose, Calif. 1993.

Rioul, O., and M. Vetterli, "Wavelers and signal processing," *IEEE Signal Processing magazine, pp.* 14–37, October 1991.

Semmlow, J. L., A. Shadagoppan, L. V. Ackerman, W. Hand, and F. S. Alcorn, "A fully automated system for screening xeromammograms," *Computers and Biomedical Research* 13, 350–62, 1980.

Specht, D. F., "Probabilistic neural networks," *Neural Networks* 3(1), 109–18, January 1990.

Unser, M., and M. Eden, "Multiresolution feature extraction and selection for texture segmentation," *IEEE Trans. on Pattern Analysis and Machine Intelligence* 11(7), July 1990.

Vyborny, C. J., and M. L. Giger, "Computer vision and artificial intelligence in mammography," *AJR* 162, 699–708, 1994.

Wei, D., H. P. Chan, M. A. Helvie, B. Sahnier, N. Petrick, D. D. Adler, and M. M. Goodsitt, "Classification of mass and normal breast tissue: Multiresolution texture analysis of digital mammograms," *Medical Physics* 22(9), September 1995.

Winsberg, F., M. Elkin, J. Macy, V. Bordaz, and W. Weymouth, "Detection of radiographic abnormalities in mammograms by means of optical scanning and compute analysis," *Radiology* 89, 211–15, 1967.

Woods, K. S., and K. Bowyer, "Computer detection of stellate lesions," *Digital Mammography*, A. G. Gale et al., eds., Elsevier Science B.V., 1994.

Wu, Y., M. L. Giger, K. Doi, C. J. Vyborny, R. A. Schmidt, and C. Metz, "Artificial neural networks in mammography: Application to decision making in diagnosis of breast cancer," *Radiology* 187, 81–87, 1993.

Yand, Z., M. Kallergi, R. A. DeVore, et al., "Effect of wavelet bases on compressing digital mammography," *IEEE Engineering in Medicine and Biology* 14(5), 570–77, September/October 1995.

Yin, F. F., M. L. Giger, K. Doi, C. E. Metz, C. J. Vyborny, and R. A. Schmidt, "Computer-aided detection of masses in digital mammograms: Analysis of bilateral subtraction images," *Medical Physics* 18, 955–63, 1991.

Zheng, B. Y., W. Qian, and L. P. Clarke, "Digital mammography: MF based NN for automatic detection of microcalcif-cations," *IEEE Trans. on Medical Imaging*, 1995 (accepted or publication).

What is claimed is:

1. A method for assisting in diagnosing a suspicious mass from a digital x-ray mammography image and for reducing inter- and intraobserver variability in diagnosis, the method comprising the steps of:

calculating from the digital mammography image a directional-feature-enhanced image;

calculating from the digital mammography image a segmented mass image comprising a set of images, the set comprising:

a first segmented mass image showing a detected segmented mass without a spiculation; and a second segmented mass image showing a detected segmented mass having a spiculation; and simultaneously displaying to an operator the digital mammography image, the directional-feature-enhanced image, and the segmented mass image, the simultaneous display for improving a detection, classification, and spatial extent of the mass.

2. A method for assisting in a remote diagnosis of a mass from a digital x-ray mammography image, the method comprising the steps of:

transporting the digital mammography image from a first site to a remote diagnostic facility;

calculating at the diagnostic facility a directional-feature-enhanced image from the digital mammography image;

calculating from the digital mammography image a segmented mass image comprising a set of images, the set comprising:

an first segmented mass image showing a detected segmented mass without a spiculation; and a second segmented mass image showing a detected segmented mass having a spiculation;

simultaneously displaying to an operator the digital mammography image, the directional-feature-enhanced image, and the segmented mass image, the simultaneous display for improving a detection, classification, and spatial extent of the mass; and reporting a classification diagnosis to the first site.

3. An apparatus for assisting in diagnosing a suspicious mass from a digital x-ray mammography image and for reducing inter- and intraobserver variability in diagnosis, the apparatus comprising:

means for calculating from the digital mammography image a directional-feature-enhanced image;

means for calculating from the digital mammography image a segmented mass image comprising a set of images, the set comprising:

a first segmented mass image showing a detected segmented mass without a spiculation; and a second segmented mass image showing a detected segmented mass having a spiculation; and means for simultaneously displaying to an operator the digital mammography image, the directional-feature-enhanced image, and the segmented mass image, the simultaneous display for improving a detection and classification of the mass.

4. The apparatus recited in claim 3, wherein the displaying means comprises means for simultaneously displaying to an operator the digital mammography images, the directional-feature-enhanced images, and the segmented mass images for both the left and the right breast, the simultaneous display for improving a detection and classification of the mass.

5. An apparatus for assisting in a remote diagnosis of a mass from a digital x-ray mammography image, the apparatus comprising:

means for transporting the digital mammography image from a first site to a remote diagnostic facility;

means for calculating at the diagnostic facility a directional-feature-enhanced image from the digital mammography image;

means for calculating from the digital mammography image a segmented mass image comprising a set of images, the set comprising:

a first segmented mass image showing a detected segmented mass without a spiculation; and a second segmented mass image showing a detected segmented mass having a spiculation;

means for simultaneously displaying to an operator the digital mammography image, the directional-feature-enhanced image, and the segmented mass image, the simultaneous display for improving a detection and classification of the mass; and means for reporting a classification diagnosis to the first site.

* * * * *